(12) United States Patent
Yee

(10) Patent No.: US 6,456,106 B1
(45) Date of Patent: Sep. 24, 2002

(54) METHOD AND CIRCUIT FOR DETECTION OF PRIMARY SWITCHES STATUS IN ISOLATED DC/DC CONVERTERS

(75) Inventor: Hsian-Pei Yee, Seattle, WA (US)

(73) Assignee: SRMOS, Inc., Seattle, WA (US)

( * ) Notice: Subject to any disclaimer, the term of this patent is extended or adjusted under 35 U.S.C. 154(b) by 0 days.

(21) Appl. No.: 09/581,097

(22) PCT Filed: Dec. 8, 1998

(86) PCT No.: PCT/US98/26141

§ 371 (c)(1),
(2), (4) Date: Jun. 7, 2000

(87) PCT Pub. No.: WO99/30407

PCT Pub. Date: Jun. 17, 1999

Related U.S. Application Data

(60) Provisional application No. 60/067,909, filed on Dec. 8, 1997.

(51) Int. Cl.[7] .............................. G01R 31/36; H02J 1/00
(52) U.S. Cl. ............................................ 324/771; 363/15
(58) Field of Search .................................. 324/771, 765; 321/2; 327/172; 363/26, 15; 326/82; 307/130

(56) References Cited

U.S. PATENT DOCUMENTS

| | | | | |
|---|---|---|---|---|
| 3,735,235 A | * | 5/1973 | Hamilton et al. ............... 321/2 |
| 4,000,410 A | * | 12/1976 | Hentschel et al. ........... 324/771 |
| 4,591,962 A | * | 5/1986 | Schwarz et al. .............. 363/15 |
| 5,140,513 A | * | 8/1992 | Yokoyama ................... 363/26 |
| 5,378,933 A | * | 1/1995 | Pfannenmueller et al. .. 327/172 |
| 5,461,297 A | | 10/1995 | Crawford ...................... 320/1 |
| 5,498,972 A | * | 3/1996 | Haulin ....................... 324/765 |
| 5,684,681 A | * | 11/1997 | Huh .............................. 363/26 |
| 5,694,305 A | | 12/1997 | King et al. ................... 363/21 |
| 5,747,976 A | | 5/1998 | Wong et al. ................. 323/282 |
| 5,825,103 A | * | 10/1998 | Lee ............................. 307/130 |
| 5,936,429 A | * | 8/1999 | Tomita ......................... 326/82 |
| 6,069,799 A | * | 5/2000 | Bowman et al. .............. 363/15 |

\* cited by examiner

*Primary Examiner*—Michael Sherry
*Assistant Examiner*—Anand Bamin
(74) *Attorney, Agent, or Firm*—Oppenheimer Wolff & Donnelly LLP; Claude A. S. Hamrick

(57) ABSTRACT

A method and circuit for detecting primary switch (12) status in isolated DC/DC converters by observing the falling speed of the voltage level at the sensing point (node Z) is disclosed. It is noted that high impedance oscillation has a relatively slow falling or rising time when compared to a valid signal. By observing the falling or rising time of a given signal during the appropriate time period, a determination can be made to differentiate a valid signal and an oscillating signal. More specifically, two reference voltages (A & B) are provided to compare against node Z voltage to generate a sense pulse. A reference pulse having a predefined duration is compared to the sense pulse. If the duration of the sense pulse is greater than the duration of the reference pulse, a latch is used to generate a low output signal. If the duration of the sense pulse is less than the duration of the reference pulse, a high output signal is generated. The latch is reset when node Z voltage rises above reference voltage B.

10 Claims, 6 Drawing Sheets

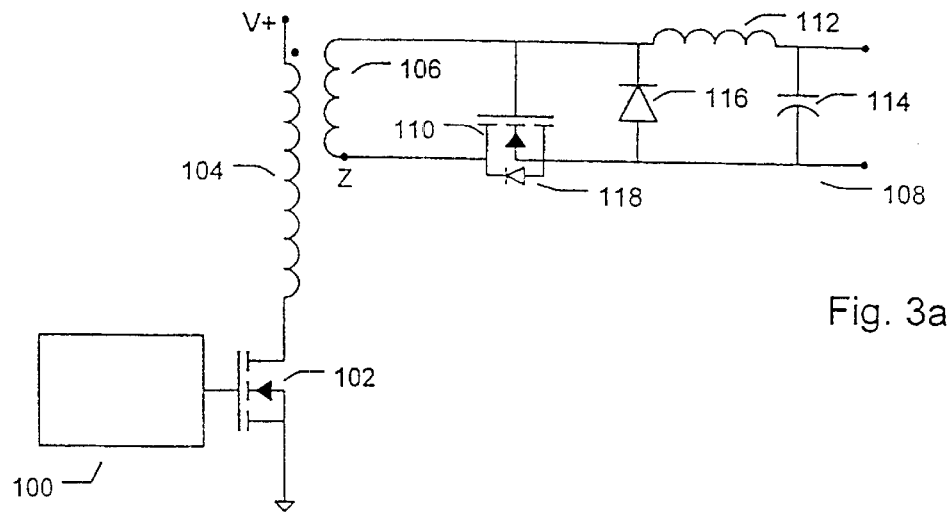
Fig. 3a
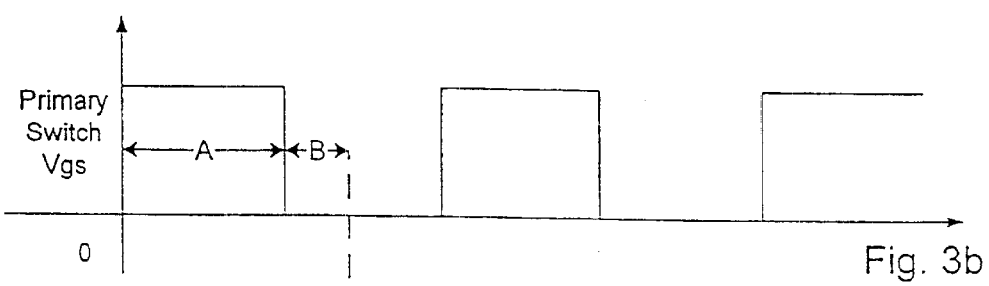
Fig. 3b
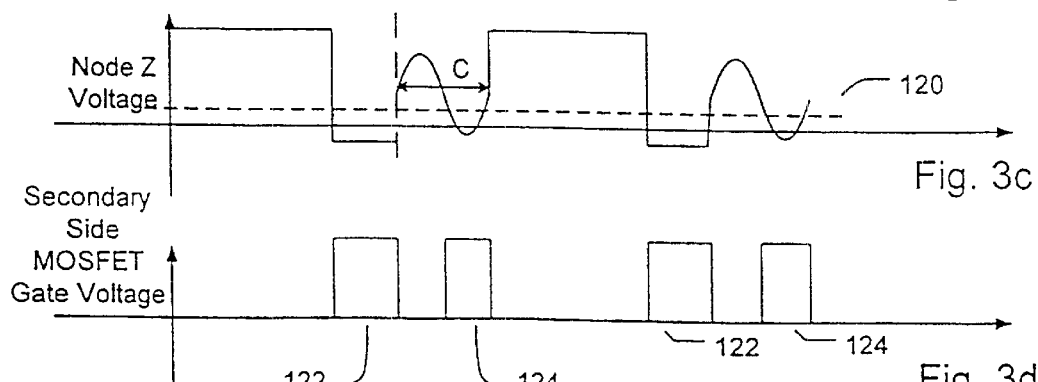
Fig. 3c
Fig. 3d

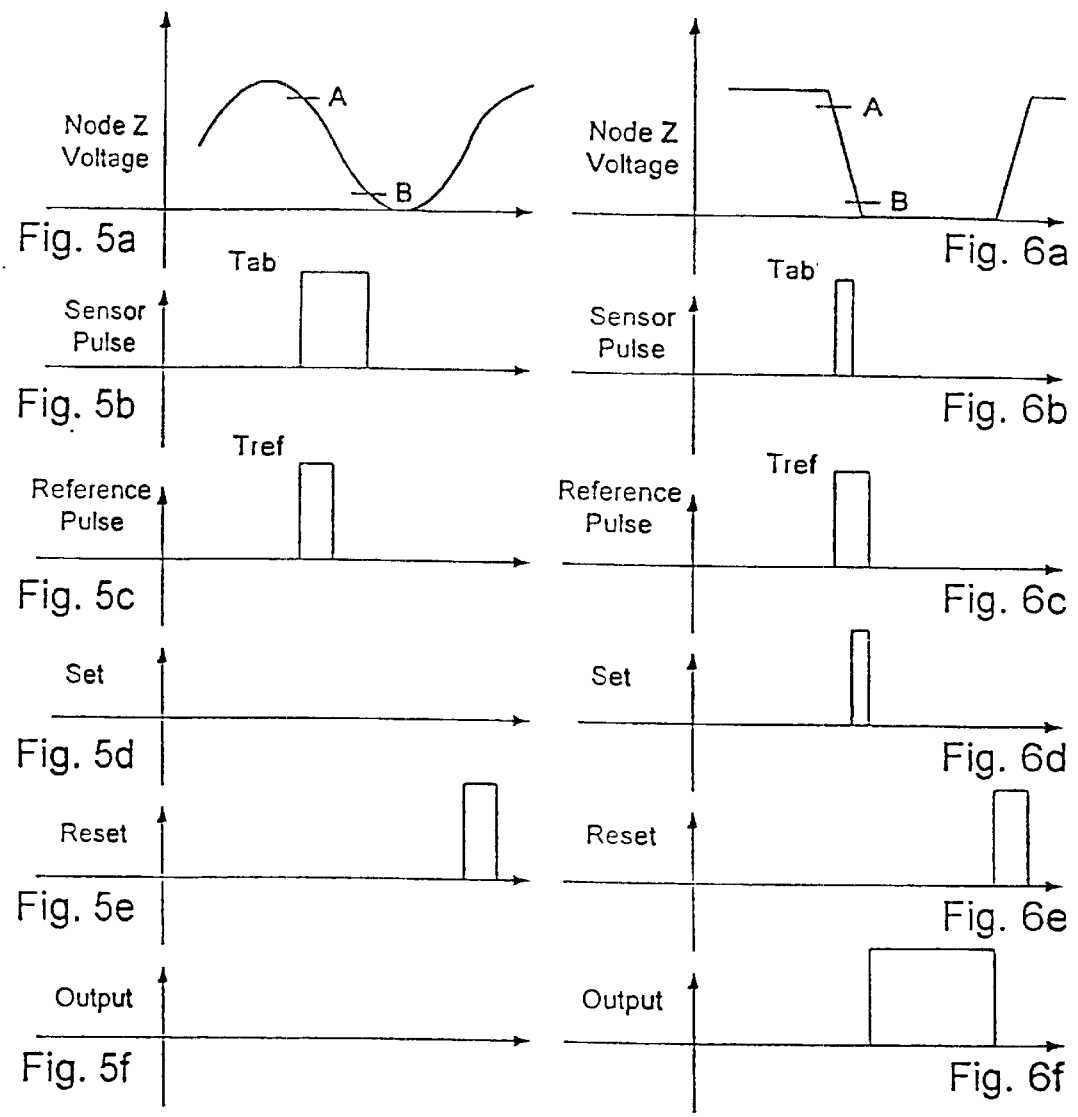

METHOD AND CIRCUIT FOR DETECTION OF PRIMARY SWITCHES STATUS IN ISOLATED DC/DC CONVERTERS

CROSS REFERENCE

This application is filed under 35 USC 371 and is a U.S. National Stage Application of PCT/US98/26141, filed Dec. 8, 98, which claims the benefit of U.S. provisional application No. 60/067,909, filed Dec. 8, 1997.

FIELD OF THE INVENTION

The present invention generally relates to methods and circuits for power converters, and, in particular, direct-current (DC) to direct-current converters.

BACKGROUND OF THE INVENTION

In DC/DC converters, after the inductor energy has been discharged into the load and before the inductor energy is replenished via the primary switch, the impedance at some of the nodes becomes high and the parasitic elements cause the node voltages to oscillate. Such oscillation is indicative that the inductor voltage has been totally discharged and the primary switch is off. Referring to FIGS. 1a–1d, an example of a flyback converter and the corresponding voltage levels at the different nodes are illustrated. The flyback converter is generally comprised of a primary control circuit 10 operating a transistor 12 for fluctuating the current passing through coil 14, thereby creating a magnetic field affecting the secondary coils (16, 18). The energy in the secondary subcircuits (20 and 22) generates two outputs. The first output generated by the first subcircuit 20 is fed back to the primary control circuit 10 via an isolated path 24. Each of the subcircuits is comprised of a coil (16, 18) connected in series with a diode (26, 28) and a capacitor (30, 32).

Three other figures are provided to illustrate the voltage or current levels at the various points in the circuit of FIG. 1a. FIG. 1b illustrates the Vgs voltage of the primary switch 12, FIG. 1c illustrates the voltage at node Z, and FIG. 1d illustrates the secondary diode current.

During period A, referring to FIGS. 1b, 1c, and 1d, node Z voltage becomes high when the primary switch is on and the inductor is being charged. During period B, node Z voltage becomes slightly negative, the primary switch is off, and the inductor is being discharged by the load via the diode. Under some operating conditions, the converter goes into an oscillating situation illustrated in period C. When the primary switch is off, the inductor energy has been totally discharged and the diode is off. During period C, impedance at node Z becomes high and its voltage oscillates according to the parasitic elements associated with this node. The same oscillation occurs in other types of DC/DC converters. Such oscillation makes secondary side post regulation ("SSPR") and synchronous rectifier MOSFET ("SRMOS") control difficult.

Referring to FIGS. 2a–2d, a SSRP circuit and corresponding voltage levels are illustrated. The SSRP circuit is similar to the circuit of FIG. 1a. Here, there is a primary control circuit 50 operating a transistor 52 for fluctuating the current passing through coil 54, thereby creating a magnetic field affecting the secondary coils (56, 58). The energy in the secondary subcircuits (60 and 62) generates two outputs. The first output generated by the first subcircuit 60 is fed back to the primary control circuit 50 via an isolated path 64. Subcircuit 60 is comprised of a coil 56 connected in series with a diode 66 and a capacitor 70. Subcircuit 62 is comprised of a coil 58 connected in series with a diode 68, a secondary side transistor (typically a MOSFET) 74, and a capacitor 72. The secondary side transistor 74 is operated by a SSPR PWM circuit 76 with a sensing point at node Z.

As before, three other figures are provided to illustrate the voltage levels at the various points in the circuit of FIG. 2a. FIG. 2b illustrates the Vgs voltage of the primary switch 52, FIG. 2c illustrates the voltage at node Z, and FIG. 2d illustrates secondary side transistor 74 gate voltage (Vgs).

Referring to FIG. 2a, when the SSPR circuit is operated, node Z voltage is used to determine the state of the primary switch. When node Z voltage falls bellow a reference voltage, the SSRP circuit turns on the secondary transistor 74 to regulate the output voltage. However, referring to FIGS. 2b, 2c, and 2d, during period C when node Z voltage is oscillating, the secondary transistor 74 may falsely turn on when node Z voltage drops below a reference voltage 78. As indicated at 80, during period B, the secondary side transistor correctly turns on. As indicated at 82, the secondary side transistor incorrectly turns on when the voltage oscillating and dropping below the reference voltage.

This oscillation also causes problems when a SRMOS converter is used. Referring to FIGS. 3a–3d, a forward DC/DC converter circuit and corresponding voltage levels are illustrated. The SRMOS circuit comprises a primary control circuit 100 operating a transistor 102 for fluctuating the current passing through coil 104, thereby creating a magnetic field affecting the secondary coil 106. The energy in the secondary subcircuit 108 generates an output. Subcircuit 108 is comprised of a coil 106 connected in series with a SRMOS 110, an inductor 112, and a capacitor 114, and connected in parallel with a diode 116. There is a diode 118 across SRMOS 110.

As before, three other figures are provided to illustrate the voltage levels at the various points in the circuit of FIG. 3a. FIG. 3b illustrates the Vgs voltage of the primary switch 102, FIG. 3c illustrates the voltage at node Z and FIG. 3d illustrates the Vgs voltage of the SRMOS 110.

In a forward DC/DC converter such as illustrated in FIG. 3a, when the SRMOS is controlled as a function of the node Z voltage, referring to FIGS. 3b, 3c, and 3d, the SRMOS 110 may falsely turn on (as indicated at 124). This mode of operation typically occurs during light load conditions where the inductor energy is dissipated before the primary switch is turned on. During this period, the impedance at node Z is high and its voltage oscillates according to the parasites associated with this node.

Therefore, there is a desire to have a method/circuit to distinguish between a valid signal or an unwanted oscillating signal resulting from the parasites.

SUMMARY OF THE INVENTION

It is therefore an object of the present invention to provide a method and circuit for detection of primary switch status in DC/DC converters.

It is another object of the present invention to provide a method and circuit for distinguishing between a valid signal and a high impedance oscillating signal.

Briefly, a presently preferred embodiment of the present invention provides a method and circuit for detecting primary switch status in isolated DC/DC converters by observing the falling speed of the voltage levels at the sensing point (node Z). It is noted that high impedance oscillation has a relatively slow falling or rising time when compared to a valid signal. By observing the falling or rising time of a given signal during the appropriate time period, a determination can be made to differentiate a valid signal and an oscillating signal. More specifically, two reference voltages are provided to compare against node Z voltage to generate a sense pulse. A reference pulse having a predefined duration is compared to the sense pulse. If the duration of the sense pulse is greater than the duration of the reference pulse, a latch is used to generate a low output signal. If the duration of the sense pulse is less than the duration of the reference pulse, a high output signal is generated. The latch is reset when node Z voltage rises above reference voltage B.

Although the methods and circuits of the present invention is applicable to DC/DC converter circuits, it may be applicable to any and all relevant circuits. Even when standing alone, it can serve as an independent circuit for differentiating different signals by their respective falling and/or rising speeds as indicated by two reference (voltage or current) signals.

An advantage of the present invention is to provide a method and circuit for detection of primary switch status in DC/DC converters.

Another advantage of the present invention is to provide a method and circuit for distinguishing between a valid signal and a high impedance oscillating signal.

These and other features and advantages of the present invention will become well understood upon examining the figures and reading the following detailed description of the invention.

DRAWINGS

FIGS. 3a–3d illustrate a SRMOS circuit and the corresponding timing diagrams of the voltage levels at the various nodes of the circuit.

FIGS. 5a–5f illustrates the timing diagrams of the circuit of FIG. 4 for the high impedance oscillation case.

FIGS. 6a–6f illustrates the timing diagrams of the circuit of FIG. 4 for the valid signal case.

DETAILED DESCRIPTION OF THE PREFERRED EMBODIMENTS

Figure 1A:
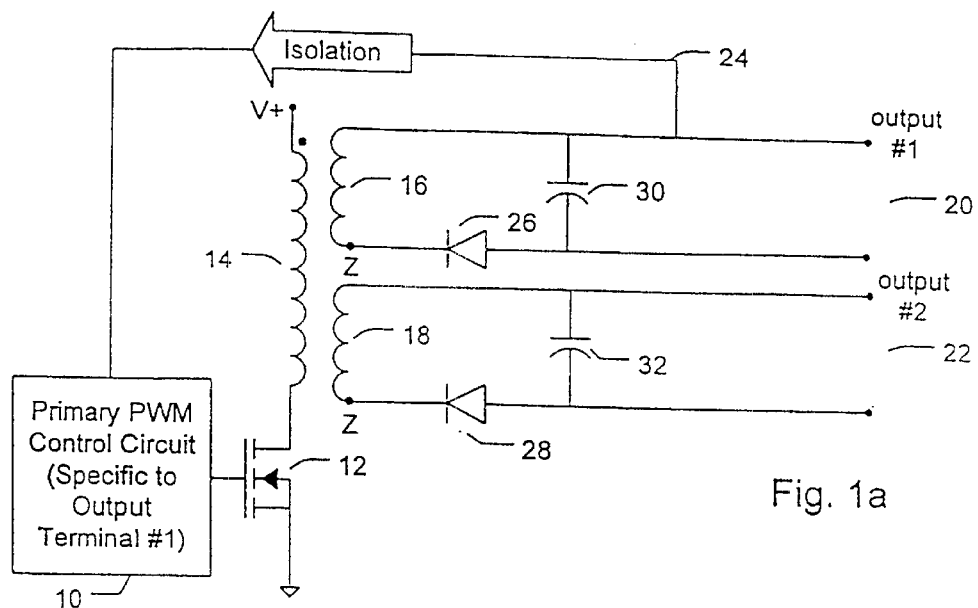
FIGS. 1a–1d illustrate a flyback circuit and the corresponding timing diagrams of the voltage levels at the various nodes of the circuit.
Figure 1B:
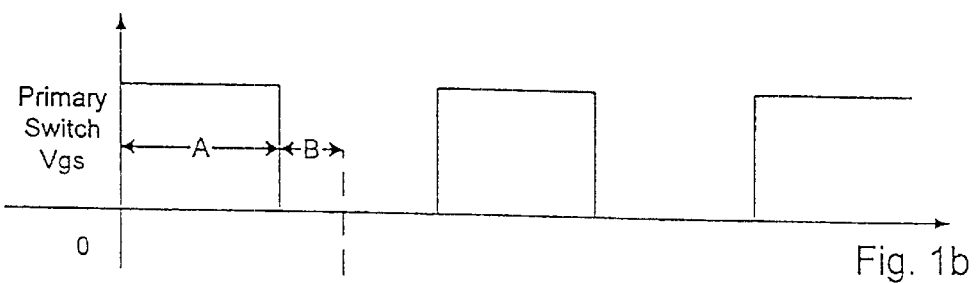
Figure 1C:
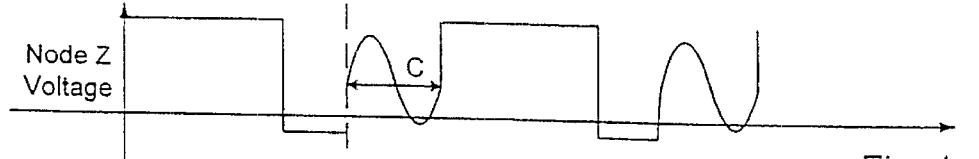
Figure 1D:
Figure 2A:
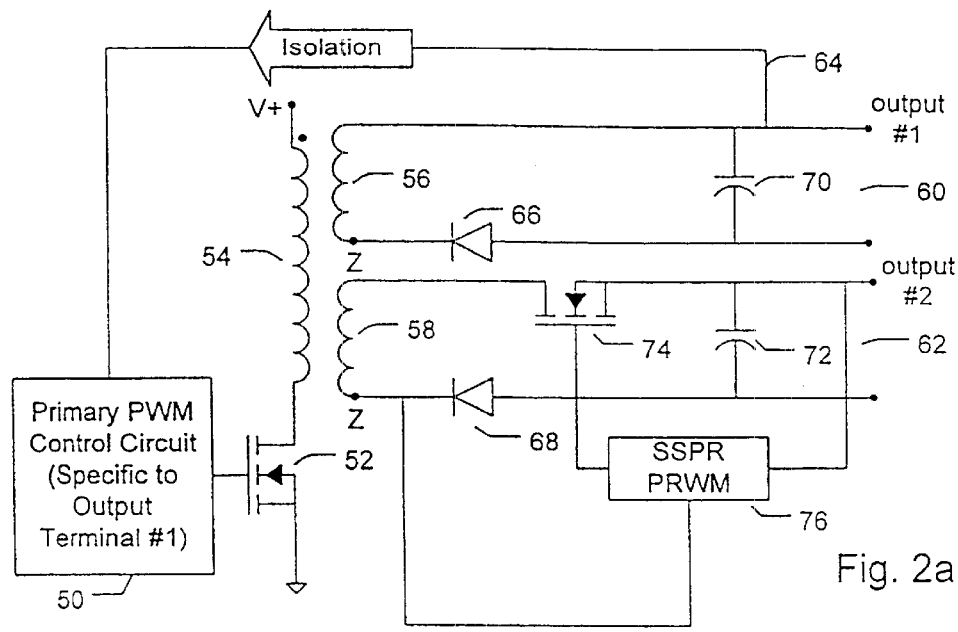
FIGS. 2a–2d illustrate a SSPR circuit and the corresponding timing diagrams of the voltage and current levels at the various nodes of the circuit.
Figure 2B:
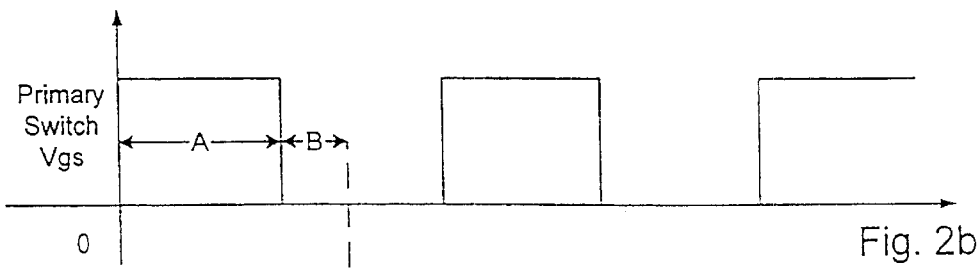
Figure 2C:
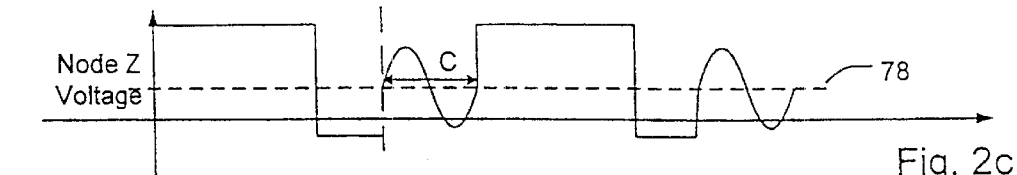
Figure 2D:
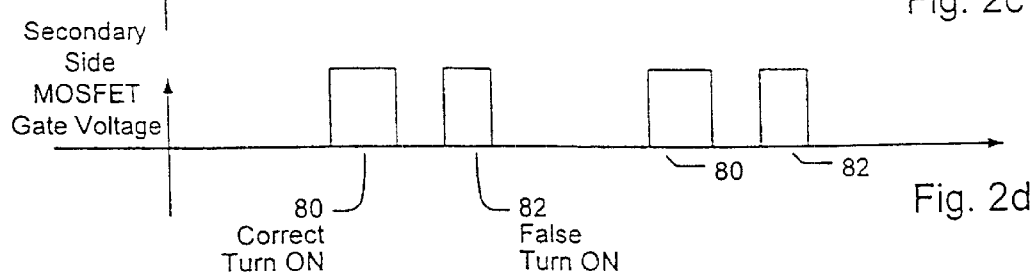
Figure 4:
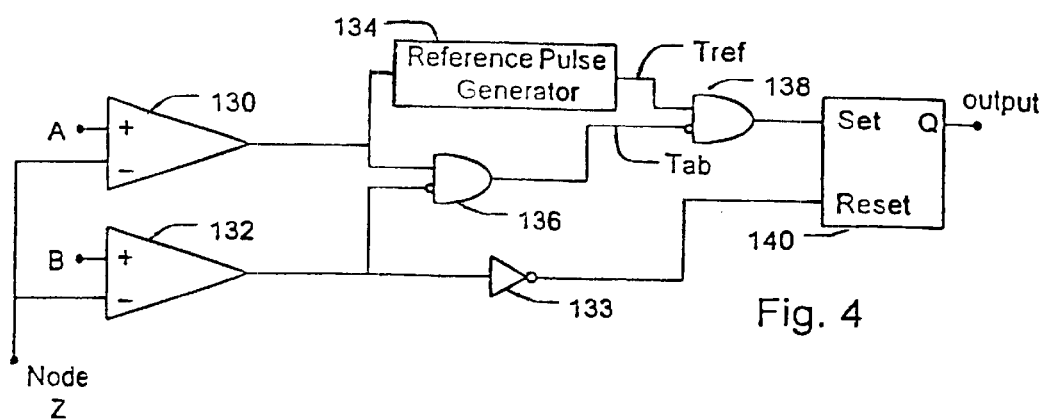
FIG. 4 illustrates one circuit embodiment of the method of the present invention.

A presently preferred embodiment of the present invention provides a method and circuit for detecting primary switch status in isolated DC/DC converters by observing the falling speed of the voltage level at the sensing point (node Z). It is noted that high impedance oscillation has relatively slow falling or rising time when compared to a valid signal. By observing the falling or rising time of a given signal during the appropriate time period, a determination can be made to differentiate a valid signal and an oscillating signal. There are many possible circuit implementations for differentiating between a valid signal and an oscillating signal. FIG. 4 illustrates one possible circuit implementation.

Referring to FIG. 4, a circuit is illustrated comprising two comparators 130 and 132. Comparator 130 receives a reference voltage A and node Z voltage, and comparator 132 receives a reference voltage B and node Z voltage. The output of comparator 130 is directed to a reference pulse generator 134 and an AND gate 136, and the output of comparator 132 is directed to the AND gate 136 and the reset terminal of a flip-flop 140 via an inverter 133. The output of the reference pulse generator 134 and the output of the AND gate 136 are provided to AND gate 138, which generates an output to the set terminal of a latch 140. The output of the latch (Q terminal) indicates the type of signal at node Z. If the output is low, it indicates high impedance oscillation.

In operation, two reference voltages, A and B, are provided where reference voltage A is larger than reference voltage B. When node Z voltage first drops below reference voltage A, the sense pulse goes high and remains high until node Z voltage crosses below reference voltage B. The timing width of the sense pulse Tab is an indication of the type of node Z voltage swing speed and it is compared to a reference timing pulse (Tref). The reference timing pulse's starting edge is the same as the sense edge. When Tab is greater than Tref, node Z is in high impedance oscillation. When Tab is less than Tref, node Z is not in high impedance oscillation.

For the case of high impedance oscillation signal, FIGS. 5a–5f illustrate the corresponding timing diagrams for detecting high impedance oscillation. FIG. 5a illustrates a high impedance oscillating signal at node Z. FIG. 5b illustrates the sense pulse generated when node Z voltage crosses from reference voltage A to reference voltage B. FIG. 5c illustrates the preset internal reference pulse, which can be adjusted accordingly. Furthermore, it can be a static reference pulse or a dynamic adoptive reference pulse. FIG. 5d illustrates the set signal. For this case of high impedance oscillation, there is no set signal triggered because the reference pulse is completely masked by the sense pulse. FIG. 5e illustrates the reset signal, which is triggered when node Z voltage rises above reference voltage B. FIG. 5f illustrates the output signal. For the high impedance oscillation case, the output signal remains low.

For the case of a valid signal, FIGS. 6a–6f illustrate the corresponding timing diagrams for detecting a valid signal. FIG. 6a illustrates a signal at node Z considered to be a valid signal. FIG. 6b illustrates the sense pulse generated when node Z voltage crosses from reference voltage A to reference voltage B. FIG. 6c illustrates the preset internal reference pulse. Note that the reference pulse can be a static reference pulse or a dynamic, adoptive reference pulse generated by other appropriate methods or circuitry. FIG. 6d illustrates the set signal. For the case of a valid signal, a set signal is triggered by the unmasked portion of the reference pulse. FIG. 6e illustrates the reset signal, which is triggered when node Z voltage rises above reference voltage B. FIG. 6f illustrates the output signal. For a valid signal, the output signal is high.

Figure 7:
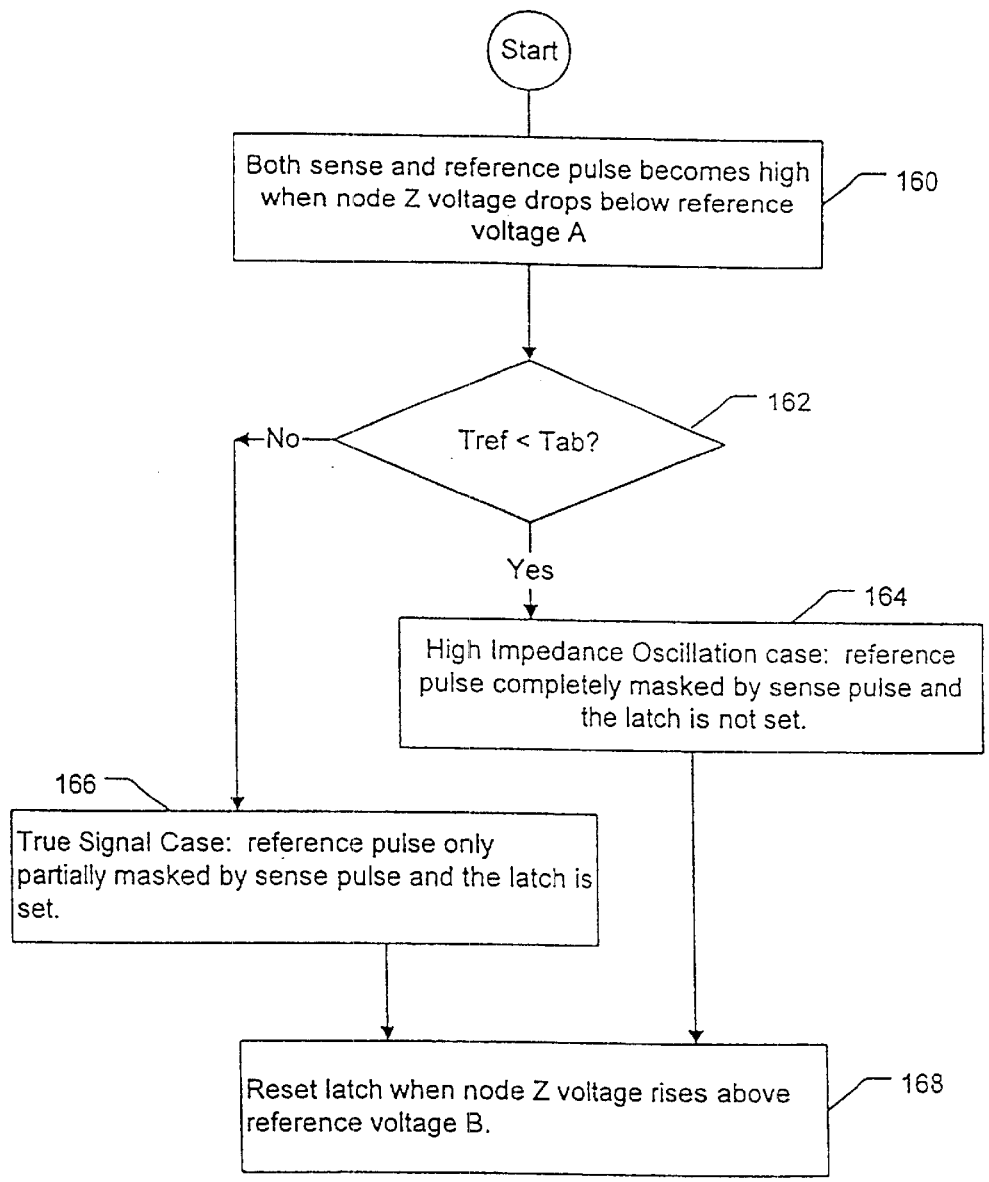
FIG. 7 is a flow chart illustrating the steps of the preferred method of the present invention.

FIG. 7 illustrates the method steps of the preferred embodiment of the present invention. In a first step 160, both sense pulse and reference pulse becomes high when node Z voltage drops below reference voltage A. In the next step 162, the duration of the sense pulse and the duration of the reference pulse are compared. If the duration of the sense pulse is greater than the duration of the reference pulse 164, the latch is not set and the output signal is low. If the duration of the sense pulse is less than the duration of the reference pulse 166, the latch is set and the output signal is high. The latch is reset when node Z voltage rises above reference voltage B 168.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A circuit for detecting the changing speed of the voltage potential of a source signal and generating a output signal indicative thereof, comprising:

a first comparator for receiving a source signal and a first reference voltage signal and operative to generate a first comparator signal;

a second comparator for receiving said source signal and a second reference voltage signal and operative to generate a second comparator signal;

a reference pulse generator responsive said first comparator signal and operative to generate a reference pulse signal having a predefined reference-pulse duration;

a first AND gate for receiving said first comparator signal and an inverted said second comparator signal and operative to generate a first AND signal;

a second AND gate for receiving said reference pulse signal and said first AND signal and operative to generate a second AND signal;

a first inverter for receiving said second comparator signal and operative to generate an inverted comparator signal; and a latch having a set terminal for receiving said second AND signal a reset terminal for receiving said inverted comparator signal and an output terminal at which said output signal is generated in response to the input of said second AND signal and said inverted comparative signal.

2. In a converter circuit having a primary side circuitry having a primary switch affecting the generation of a magnetic field for energizing one or more coils of one or more secondary subcircuits to generate one or more output voltage signals, an improved method for detecting primary switch status comprising the steps of:

a) providing a first reference voltage signal having a first voltage potential and a second reference voltage signal having a second voltage potential;

b) comparing a source signal proportional to one of the output signals to said first reference signal and said second reference signal and generating a sense pulse having a sense-pulse duration that is a function of the source signal, said first reference signal and said second reference signal, said source signal being sensed from a node adjacent to a coil of a secondary subcircuit;

c) generating a reference pulse having a predefined reference-pulse duration when the voltage potential of said source signal matches the voltage potential of said first reference voltage signal; and d) generating an output signal as a function of said sense-pulse duration and said reference-pulse duration, said output signal being indicative of the switching status of said primary switch.

3. A method for detecting the changing speed of the voltage potential of a source signal and generating an output signal indicative thereof, comprising the steps of:

a) providing a first reference voltage signal having a first voltage potential and a second reference voltage signal having a second voltage potential;

b) comparing the source signal to said first reference signal and said second reference signal and generating a sense pulse having a sense-pulse duration that is a function of the source signal, said first reference signal and said second reference signal;

c) generating a reference pulse having a predefined reference-pulse duration when the voltage potential of said source signal matches the voltage potential of said first reference voltage signal; and d) generating an output signal as a function of said sense-pulse duration and said reference-pulse duration.

4. A method as recited in claim 1 wherein in said step b) said sense-pulse duration has a duration starting time when the voltage potential of said source signal matches the voltage potential of said first reference signal and has a duration ending time when the voltage potential of said source signal matches the voltage potential of said second reference signal.

5. A method as recited in claim 1 wherein in said step c) said predefined reference-pulse duration is a static duration.

6. A method as recited in claim 1 wherein in said step c) said predefined reference-pulse duration is generated dynamically as a function of a designated signal.

7. A method as recited in claim 1 wherein said source signal is a node signal from a converter circuit.

8. A method as recited in claim 7 wherein said converter circuit is a DC/DC converter circuit.

9. A method as recited in claim 8 wherein said converter circuit is an isolated DC/DC converter circuit.

10. A method as recited in claim 1 wherein said output signal indicates an oscillating signal when said reference-pulse duration is less than said sense-pulse duration.

* * * * *